Dec. 26, 1961  V. E. SWENSON  3,014,734
TRACTOR FRONT END AND AXLE STRUCTURE PROVIDING
ADJUSTABLE WHEEL BASE
Filed March 16, 1959  2 Sheets-Sheet 1

*INVENTOR.*
V. E. SWENSON

Dec. 26, 1961  V. E. SWENSON  3,014,734
TRACTOR FRONT END AND AXLE STRUCTURE PROVIDING
ADJUSTABLE WHEEL BASE
Filed March 16, 1959  2 Sheets-Sheet 2
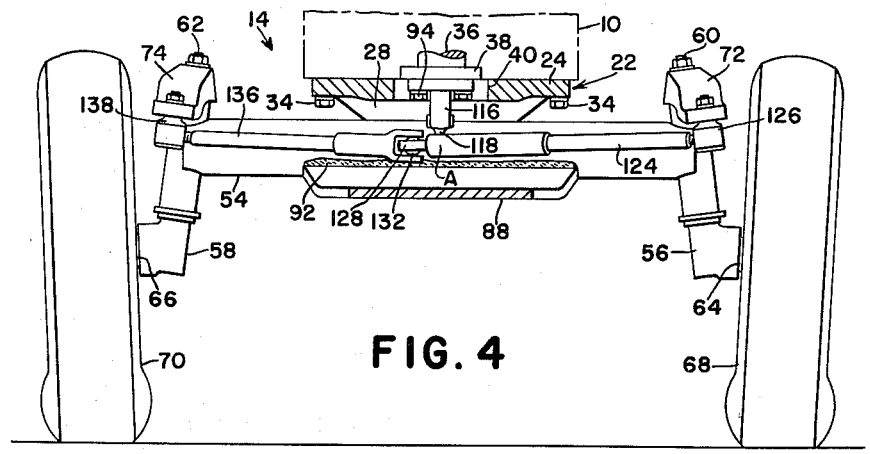
FIG. 4
FIG. 5
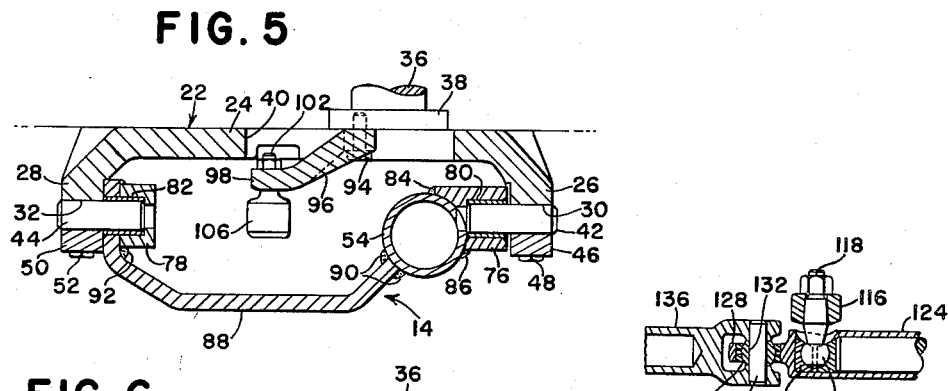
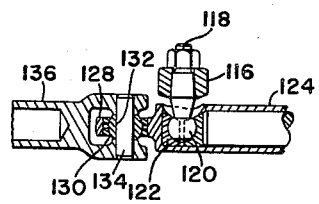
FIG. 7
FIG. 6
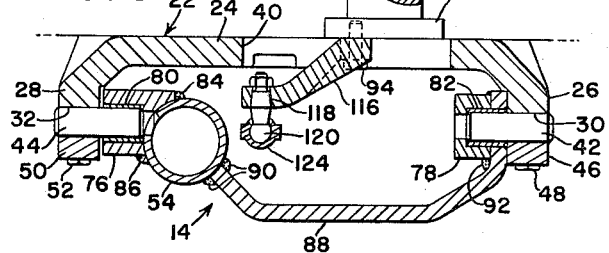
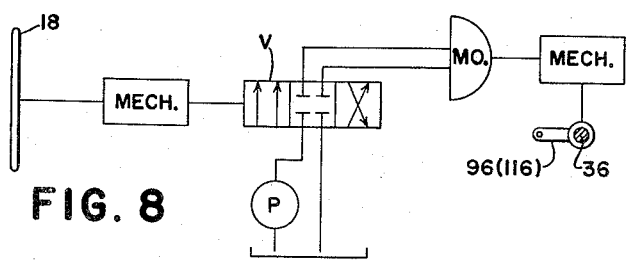
FIG. 8
*INVENTOR.*
V. E. SWENSON United States Patent Office 3,014,734
Patented Dec. 26, 1961

3,014,734
TRACTOR FRONT END AND AXLE STRUCTURE PROVIDING ADJUSTABLE WHEEL BASE
Victor E. Swenson, Cedar Falls, Iowa, assignor to Deere & Company, Moline, Ill., a corporation of Delaware
Filed Mar. 16, 1959, Ser. No. 799,660
1 Claim. (Cl. 280—95)

This invention relates to a tractor front end construction and more particularly to an improved front axle structure which is capable of occupying two positions spaced apart fore and aft from each other so as to give the tractor what may be regarded as an adjustable wheel base.

In general, shiftable front axle structures are known, and the present invention has for a principal object the provision of improvements over known types so as to eliminate the major disadvantages concerned with problems involved in the steering linkages when the front axle is changed between its two positions. According to the present invention, there is provided an improved supporting structure with respect to which the axle is capable of reversal end for end so as to occupy either a forward position or a rearward position. A further object of the invention is to provide a novel steering arrangement which may be readily interchanged when the axle structure is changed from one position to another. Further objects reside in improved tie-rod connections, improved supporting structure, and improved means for effecting the connection between either of the tie-rod arrangements and the basic steering system.

The foregoing and other important objects and desirable features inherent in and encompassed by the invention will become apparent as the preferred embodiment thereof is disclosed, by way of example, in the ensuing description and accompanying sheets of drawings, the several figures of which are described immediately below.

FIG. 4 is a front view, partly in section, as seen substantially along the staggered line 4—4 on FIG. 3.

FIG. 5 is an enlarged section as seen substantially along the line 5—5 of FIG. 2.

FIG. 6 is a similar section as seen along the line 6—6 of FIG. 3.

FIG. 7 is an enlarged section as seen along the line 7—7 of FIG. 3.

FIG. 8 is a diagram of a representative hydraulic steering circuit.

Figure 1:
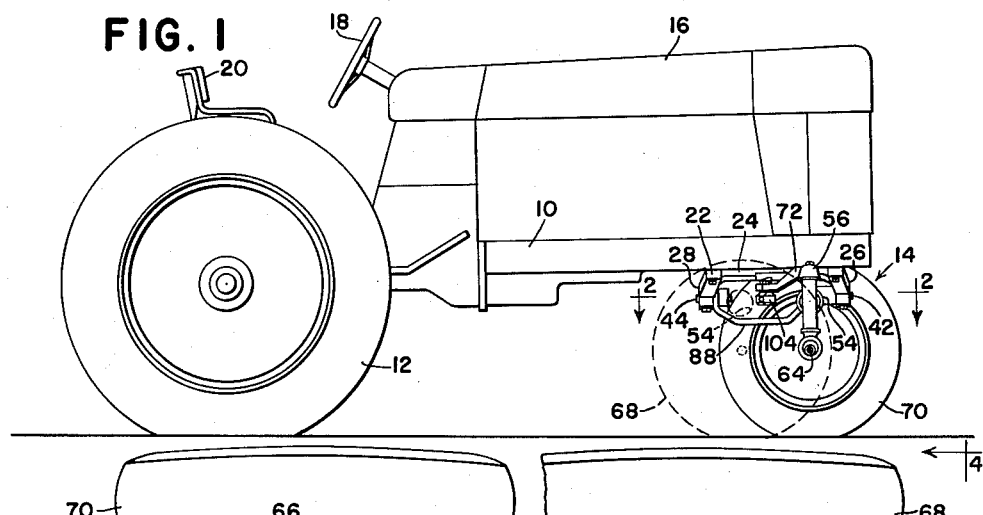
FIG. 1 is a side elevation of a typical tractor, one of the front wheels being removed to expose the supporting structure, and dotted lines being used to illustrate the shorter wheel base position of the front axle structure.

The tractor chosen for purposes of illustration is a typical commercially popular agricultural tractor having a main fore-and-aft or longitudinal body 10 supported on rear wheels 12 and a front axle structure indicated in its entirety by the numeral 14. The tractor includes the usual radiator grille and hood structure 16 behind which is a steering wheel 18 conveniently located relative to an operator's seat 20.

The front end of the body has rigidly secured thereto a front body part 22, here in the form of a casting or the like having an upper wall portion 24 and first and second or front and rear depending supports 26 and 28 respectively. The support 26 is in the form of a depending ear apertured at or provided with a fore-and-aft bore 30. The rear support 28 is similarly constructed and has a coaxial fore-and-aft bore 32. This casting or part may be rigidly secured to an under portion of the front end of the body 10 as by cap screws 34 (FIG. 4).

The tractor may be equipped with any basic steering mechanism, and is here shown as including a typical hydraulic circuit including a pump P, a three-way valve V and an oscillating or vane motor MO. The steering wheel 18 is typically connected mechanically to the valve V, as indicated by the legend in FIG. 8, and the valve V is hydraulically connected to a pump P and to the motor MO by a pair of hydraulic lines. Any conventional mechanical connection, as indicated by the legend in FIG. 8, may be made to an upright steering shaft 36 which is here shown as having a lower radial circular flange 38 downwardly exposed through an aperture 40 in the upper wall part of the casting or body part 22. As will be clear to those versed in the art, turning of the steering wheel 18 actuates the valve V to cause the hydraulically powered motor to oscillate in one direction or the other and this in turn, being mechanically connected to the steering shaft 36, turns the shaft about an upright axis. In this case, the axis of the steering shaft 36 intersects the fore-and-aft axis on which the front and rear bores 30 and 32 are coaxial. These bores respectively carry fore-and-aft pintles or short shafts 42 and 44. The front support 26 is preferably of two-piece construction, including a lower complementary clamp part 46 which is secured thereto by cap screws 48 so that the pintle 42, although commonly rigidly retained, is removable. Similar construction exists relative to the rear ear or support 28, and a complementary lower part is shown at 50 and its cap screws are shown at 52.

Figure 2:
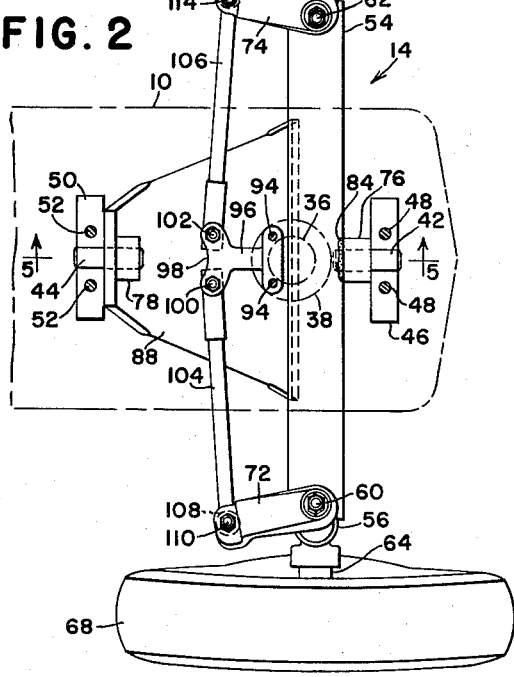
FIG. 2 is an enlarged fragmentary plan view, partly in section and partly schematic, as seen generally along the line 2—2 of FIG. 1 and illustrating the long wheel base position of the front axle.

The front axle structure 14 includes a central carrier and a transverse tubular axle 54, opposite ends of which are provided with steering knuckles 56 and 58, respectively, pivoted or steerable respectively about upright axes at 60 and 62 respectively. The knuckles, in typical automotive fashion, respectively carry wheel spindles 64 and 66 for journalling wheels 68 and 70. The knuckles also respectively include longitudinally projecting knuckle arms 72 and 74 respectively. In the long wheel base position of the front axle, shown in FIGS. 1 and 2, the steering arms project rearwardly. In the short wheel base position, shown in dotted lines in FIG. 1 and forming the basis of FIGS. 2, 3 and 6, the arms project forwardly. This will be explained below.

The central carrier part of the axle structure includes front and rear or first and second elements 76 and 78, respectively apertured at 80 and 82. These apertures are coaxial so as to selectively receive the pintles 42 and 44, depending upon the position of the axle. For this purpose, the supports 26 and 28, as already described, are similar to each other. Likewise, in all material respects, the elements 76 and 78 are similar to each other, and thus they are selectively cooperative with either of the supports. The pintles 42 and 44, for the same reason, are also similar to each other. The central carrier structure is preferably formed by a process in which the element 76 is rigidly secured directly to a central portion of the axle tube 54, as by welding at 84 and 86. This places the axle tube 54 immediately adjacent to the element 76 and relatively remote, in a fore-and-aft sense, from the operative element 78. The element 78 is rigidly joined to the tube 54 by a fore-and-aft plate portion 88 which is rigidly secured, as by welding at 90, to the tube 54 and which has its opposite end secured as by welding at 92 to the other element 78.

As seen from the side (FIGS. 5 and 6) the front body part 22 is in the form of an arch, and the sectional configuration of the central part of the axle structure is in the form of a complementary U, thus affording between the wall 24 and the intermediate plate portion 88 a usable space in which basic steering connections are effected, as will be explained below. This space is available in both the long wheel base position and the short wheel base position of the front axle structure, which thus contributes to the low cost design and compactness of the present structure. The fore and aft offset of the axle tube 54 relative to the elements 76 and 78 enables the selective use of the two positions. For the long wheel base position, the axle structure is mounted as in FIGS. 1, 2 and 5, with the axle tube 54 forwardly, in which position it is slightly ahead of the rotating axis of the steering shaft 36. In the short wheel base position, the axle structure is turned end for end so that the tube 54 lies rearwardly of the steering shaft axis. In this case, the right hand wheel becomes the left hand wheel and vice versa. As already explained, the steering arms 72 and 74, which projected rearwardly in FIG. 2, now project forwardly, as seen in FIG. 3.

For the purpose of interconnecting the two steering arms 72 and 74 with the steering shaft flange 38, the latter has rigidly but removably secured thereto, as by cap screws 94, a rearwardly projecting arm 96 which has a relatively wide rear terminal or free end portion 98 vertically drilled in two places to receive a pair of vertical connections 100 and 102. These are for the purpose of establishing connection with right and left hand tie-rods 104 and 106 respectively. The outer end of the tie-rod 104 is connected by a conventional ball and socket connection, as at 108, and a threaded connector 110, to the free end of the steering arm 72. A similar connection is made at 112—114 between the outer end of the tie-rod 106 and the other steering arm 74. The inner end of the tie-rod 104 has a suitable ball and socket connection with the proximate part of the free end 98 of the steering arm 96 via the previously described connector 100. A similar relationship exists between the connector 102 and the inner end of the other tie-rod 106. As will be clear without further description, the connections at 100, 102, 108 and 112 are sufficiently flexible or universal to enable proper articulation during steering as well as articulation during oscillation of the front axle structure about the fore-and-aft axis through the mounting pintles 42 and 44. This axis is located in FIG. 4 and is illustrated by a cross designated by the letter A. Another characteristic of the connections just described is that they, along with the cap screws 94, are readily removable so as to facilitate conversion of the tractor from a long wheel base tractor to a short wheel base tractor, which entails, as already described, the reversal of the axle structure end for end.

Figure 3:
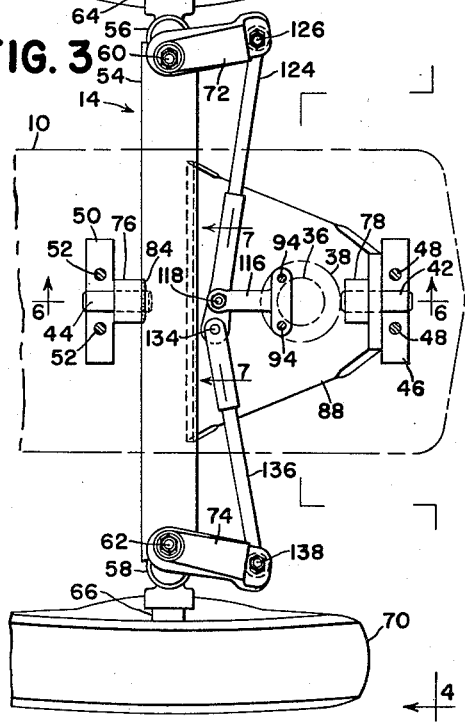
FIG. 3 is a similar view but illustrating the short wheel base position of the front axle.

FIGS. 3, 4 and 5 illustrate the short wheel base position of the axle structure. In this case, the pintles 42 and 44 have been removed so that the axle structure may be reversed end for end, after which the pintles are restored and secured again in place. The steering arm 96 is removed via the cap screws 94 and the cap screws are utilized to secure in its stead a short wheel base steering arm 116. This arm, like the arm 96, projects rearwardly to a terminal free end which receives an upright pivotal connector 118 which has its lower end provided as a ball 120. This ball is received by socket means 122 at the inner end of a tie-rod 124, and the opposite or outer end of this tie-rod is connected at 126 to the end of the knuckle arm 72. The connection at 126 partakes of the characteristics of that previously described at 108-110. As best shown in FIG. 7, the tie-rod 104 has at its inner end an integral extension 128 which includes a socket 130 for receiving a ball 132 which is in turn pinned at 134 to the bifurcated inner end of an opposite tie-rod 136. The outer end of this tie-rod is connected at 138 to the other arm 74. Again, the connection at 138 is similar to that at 126 to provide for the necessary articulation, both in steering and during oscillation of the axle about the fore-and-aft axis A.

From the description thus far, it will be seen that it is a relatively simply matter to change the tractor from a short wheel base tractor to a long wheel base tractor and vice versa. The tractor need only be adequately supported so that the weight is removed from the front wheels, after which the pins 42 and 44 are removed via the caps 46 and 50 and retaining cap screws 48 and 52. The steering arm used in the particular case (96 for the long wheel base) is removed via the cap screws 94 and the other steering arm replaced. The tie-rods for one wheel base are removed and are replaced with those of the other wheel base. Regardless of the position of the axle, as between FIGS. 5 and 6, the structural shapes of the parts 22 and 88 are such as to readily accommodate the steering arm and the proximate ends of the tie-rods. The tie-rods and steering arm connections are such as to accommodate steering of the vehicle with the axle in either position as well as accommodating oscillation of the axle about the fore and aft axis A. Since the position of the axle is reversed end for end, and the steering arms 72 and 74 will occupy different directional positions in each case, it will be necessary to interchange the hydraulic lines between the valve and the motor MO, which is a simple procedure.

The design is based on simple and low-cost construction but at the same time features high strength and durability for the purposes intended. The interchangeability of the front and rear portions of the axle structure, as in regard to the supports 26 and 28 and elements 76 and 78, enables mass production of the components with the assurance that proper fit will be obtained regardless of the change in position.

Features and advantages other than those categorically enumerated will readily occur to those versed in the art, as will many equivalent changes in the preferred embodiment illustrated, all of which may be achieved without departure from the spirit and scope of the invention.

What is claimed is:

A front end construction for a tractor having a longitudinal body, comprising: first and second fore-and-aft alined and spaced apart similar supports; means rigidly mounting said supports on the body; a steering shaft journaled on the body and having a terminal portion intermediate the supports but offset longitudinally to lie closer to the first support; axle structure including first and second similar mounting elements spaced apart fore and aft like the supports and a transverse axle rigid with and intermediate said elements to lie closer to the first support, said first and second elements being respectively detachably received by the first and second supports to mount the axle structure in a first position with the axle closer to the first support, said axle having knuckle arms pivoted on upright axes respectively to opposite ends thereof and projecting longitudinally toward the second support to dispose their free ends in transverse alinement on a line intermediate the steering shaft terminal portion and said second supports; steering linkage including a steering arm part secured to the steering shaft terminal portion and projecting toward said line and a pair of tie rod parts connected to said arm part and connected respectively to the free ends of the knuckle arms; and certain of said parts having removable connections and the aforesaid similarity of said detachable elements and supports and said removable connections enabling reversibility of said structure end for end for remounting thereof in a second position in which the first and second elements are respectively received by the second and first supports, the axle lies closer to said second element, and the knuckle arms project in the opposite direction and are so dimensioned that their free ends, in said second position, are alined on a line intermediate the steering shaft terminal portion and said second support.

References Cited in the file of this patent

UNITED STATES PATENTS

| | | |
|---|---|---|
| 2,559,935 | Brown | July 10, 1951 |
| 2,874,972 | Anderson et al. | Feb. 24, 1959 |
| 2,890,892 | Strehlow | June 16, 1959 |

FOREIGN PATENTS

| | | |
|---|---|---|
| 325,536 | Great Britain | Feb. 20, 1930 |